United States Patent [19]

Boenig

[11] Patent Number: 4,490,769
[45] Date of Patent: Dec. 25, 1984

[54] SOLID-STATE CIRCUIT BREAKER WITH CURRENT LIMITING CHARACTERISTIC USING A SUPERCONDUCTING COIL

[75] Inventor: Heinrich J. Boenig, Los Alamos, N. Mex.

[73] Assignee: The United States of America as represented by the United States Department of Energy, Washington, D.C.

[21] Appl. No.: 408,108

[22] Filed: Aug. 16, 1982

[51] Int. Cl.³ .......................... H02H 7/00; H02H 9/00
[52] U.S. Cl. ........................................ 361/58; 361/19; 323/360; 323/363
[58] Field of Search .................... 361/58, 19; 323/360, 323/363

[56] References Cited

U.S. PATENT DOCUMENTS

| | | | |
|---|---|---|---|
| 3,723,816 | 3/1973 | Pollard | 361/58 |
| 4,045,823 | 8/1977 | Parton | 361/58 |
| 4,438,474 | 3/1984 | Paice | 361/58 |

Primary Examiner—E. A. Goldberg
Assistant Examiner—Patrick W. Foster
Attorney, Agent, or Firm—Leonard C. Brenner; Paul D. Gaetjens

[57] ABSTRACT

A thyristor bridge interposes an ac source and a load. A series connected DC source and superconducting coil within the bridge biases the thyristors thereof so as to permit bidirectional ac current flow therethrough under normal operating conditions. Upon a fault condition a control circuit triggers the thyristors so as to reduce ac current flow therethrough to zero in less than two cycles and to open the bridge thereafter. Upon a temporary overload condition the control circuit triggers the thyristors so as to limit ac current flow therethrough to an acceptable level.

4 Claims, 7 Drawing Figures

SOLID-STATE CIRCUIT BREAKER WITH CURRENT LIMITING CHARACTERISTIC USING A SUPERCONDUCTING COIL

This invention is the result of a contract with the Department of Energy (Contract No. W-7405-ENG-36).

BACKGROUND OF THE INVENTION

The present invention relates generally to current control and fault limiting in electrical power generation and transmission systems and more particularly to a solid-state circuit breaker apparatus having a current limiting characteristic and using a superconducting coil.

Continued growth of electrical power generation and transmission systems has resulted in higher levels of available fault currents and correspondingly greater demands on system protective components. It is not uncommon for utility systems today to be faced with fault currents higher than the momentary and interrupting capabilities of equipment installed. In a survey conducted in February 1979 by the EEI System Planning Committee on this subject it was determined that for the next 10-year period the estimated cost of circuit breaker replacement alone was in excess of 130 million dollars.

Developing higher current interrupting rated circuit breakers and retrofitting existing power systems therewith is prohibitively costly while restructing power system networks to reduce available fault currents destroys the advantages associated with tightly interconnected generation and transmission networks. Thus the desirability of fault current limiters compatible with and insertable into present power system networks is clearly seen, as long as such current limiters are simple, reliable, cost effective, and commercially viable.

A method of controlling currents in relatively small ac circuits was developed between 1940 and 1950 using a transductor. The transductor proved impractical for larger power systems, first because its dc circuit required more ampere turns than the ac circuit, second because the dc control and dc power supply requirement was substantial, and finally because the induced electromagnetic surges into the dc circuit from a dc fault presented serious mechanical and electrical problems.

To resolve some of the problems associated with the transductor, Darton proposed a superconducting current limiting circuit having a superconducting coil which controlled the dc bias current in a transductor connected in series with the ac power line, see K. C. Darton, "A New Power System Current Limiter," Electrical Review International, Vol. 202, No. 5, February 1978. Superconductivity eliminated the problems of the massive dc room temperature-winding, the high inherent loss in the dc circuit and, by appropriate design, the electrical and mechanical stresses arising from the surge problems. The concept of having available virtually unlimited dc ampere turns at negligible running cost to "flux flood" the ac cores appeared very promising. However, in the Darton system all components have to be rated to support practically full system line voltage and pass full system current. The rating of the transductor must be about equal to the system throughput power rating and it is therefore, a very bulky and costly component.

SUMMARY OF THE INVENTION

It is therefore an object of the present invention to provide a current controlling and limiting circuit which retains the advantages of superconductivity while eliminating the disadvantages of the costly, bulky transductor.

It is another object of the present invention to provide a reliable solid-state circuit breaker current controlling and limiting characteristic using a superconducting coil.

It is yet another object of the present invention to provide a reliable solid-state circuit breaker with current controlling and limiting features for responding rapidly and appropriately to normal, temporary overload, and fault conditions.

To achieve the foregoing and other objects, and in accordance with the purposes of the present invention, as embodied and broadly described herein, the apparatus of this invention may comprise in series with an ac line to be controlled, a thyristor bridge having therebetween a dc biased superconducting coil. Under normal conditions the maintained dc coil current exceeds the ac line current and the ac line current flows through the bridge unimpeded. Once the line current trys to exceed the value of the dc coil current, the superconducting coil acts to limit the rate of increase of current. By making the inductance of the superconducting coil much greater than the ac line source inductance, a very slow increase of fault current is achieved.

After the occurrence of a fault, a thyristor control circuit gates the thyristors so as to apply a negative voltage across the superconducting coil to reduce the ac line current to zero as rapidly as possible. Thereafter the thyristors are left in a non-conducting state thereby eliminating the need for a fast-acting high-rated circuit breaker.

Under a temporary overload the thyristors are gated at such a phase angle as to permit a controlled current condition to continue for a short period before drastic action is necessarily taken.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE PREFERRED EMBODIMENT OF THE INVENTION

Figure 1:
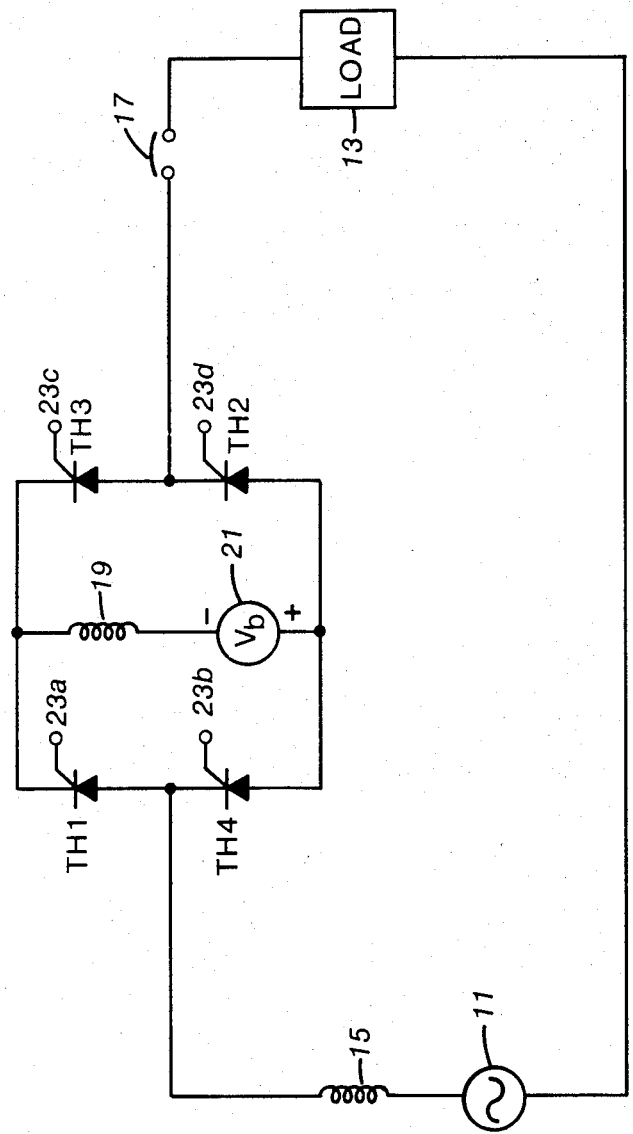
FIG. 1 is a schematic of a solid-state circuit breaker with current limiting characteristic using a superconducting coil in accord with the present invention.

With reference now to FIG. 1, it is seen that a preferred embodiment of the invention includes a thyristor bridge of thyristor strings TH1, TH2, TH3, and TH4 inserted between a power source 11 and a load 13. In order to better illustrate the principles of the present invention, only a single-phase system is shown in FIG. 1 whereas the present invention may well operate in a three-phase alternating current system. Associated with the power source 11 is a source impedance 15. A circuit breaker 17 is included in series between the power source 11 and the load 13. As will be detailed hereinafter, the circuit breaker 17 may be minimally rated and could be fashioned merely as a power switch since the present invention handles the electrical functioning of discontinuing current to the load 13 under fault current conditions. Within the thyristor bridge of thyristor strings TH1, TH2, TH3, and TH4, there is in series a superconducting coil 19 and a dc voltage biasing source 21.

Under normal operating conditions the voltage biasing source 21 induces a current through the superconductor 19 and back through the thyristor strings TH1, TH2, TH3, and TH4 at such a value as to exceed the peak acceptable operating current of power source 11. In such a normal operating condition the voltage biasing source 21 biases each thyristor in the thyristor strings TH1, TH2, TH3, and TH4 such that the ac current supplied by the power source 11 can flow bidirectionally therethrough to the load 13. Under overload conditions the thyristors in TH1, TH2, TH3, and TH4 tend to become reversed biased and thus by their nature would turn off except for a delaying pulse supplied to the thyristor gates 23a, 23b, 23c, and 23d, thereof. By selecting the phase angle of triggering on the thyristor gates 23a, b, c, and d the amount of current flow can be controlled and limited. Under these conditions, as will be explained hereinafter, some current flows through the superconductor 19. Under a fault current condition more drastic action is taken wherein triggering to the thyristor gates 23a, b, c, and d occur at a later phase angle for a period of two cycles of the ac power source 11. In approximately two cycles the current through the superconductor 19 and the load current are brought to zero and the thyristors TH1, TH2, TH3, and TH4 are left in a non-conducting condition thus preventing current flow toward the load 13. At this time the circuit breaker 17 may be opened. It is thus realized that the circuit breaker 17 may be relatively low in rating since it does not have to operate during the excessive fault current condition.

The voltage biasing source 21 establishes a bias current through the superconducting coil 19. The maximum output voltage of the voltage biasing source has to be higher than the forward voltage drop of two thyristor strings TH1, TH4, and TH2, TH3.

Figure 2:
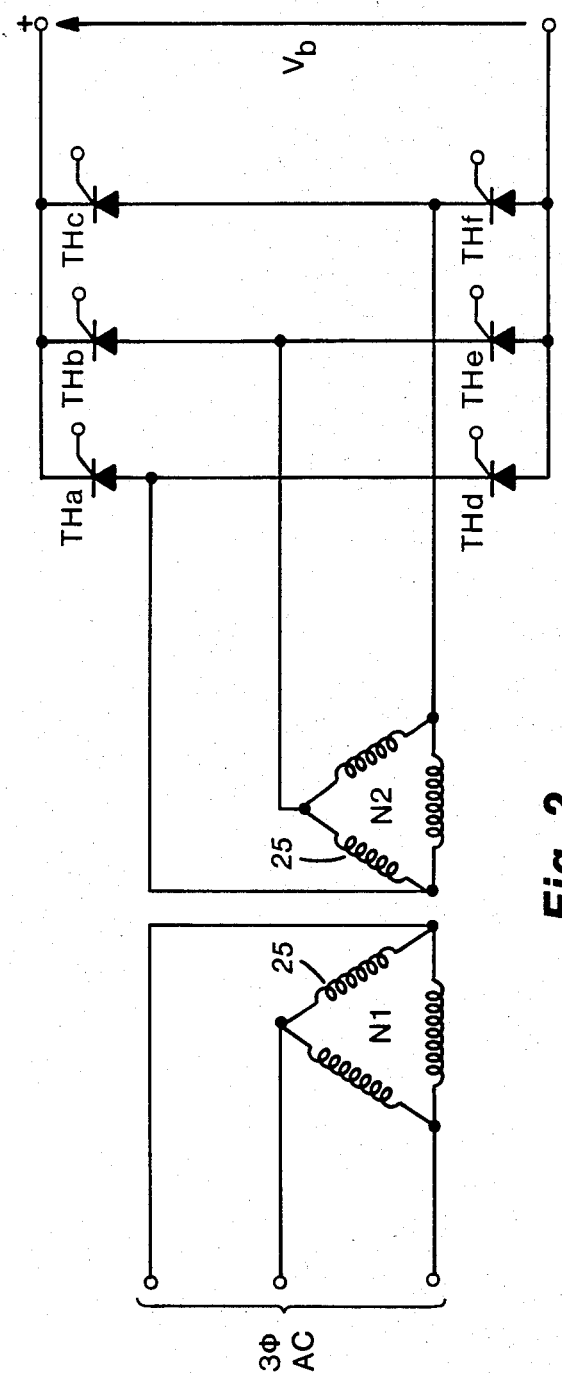
FIG. 2 is a schematic of a biasing voltage supply used in the solid-state circuit breaker of FIG. 1.

With reference to FIG. 2, it can be seen that the voltage biasing source 11 may be fabricated as a standard line commutated converter. Thus, the voltage biasing source 21 may have a three-phase transformer 25 with a turns ratio of N1/N2 chosen such that for a given system primary voltage, the desired maximum bias voltage $V_b$ max is obtained. By phase control action of the thyristors $TH_a$ to $TH_f$, the bias voltage can be changed in the range $-V_b$ max $\leq V_b \leq V_b$ max. When the bias voltage $V_b$ is higher than the forward voltage drop of the thyristor series connection TH1, TH4, or TH2, TH3, the current in the superconducting coil 19 increases. When the bias voltage $V_b$ is equal to the forward voltage drop of the thyristor strings TH1, TH4, or TH2, TH3, the superconducting coil 19 current stays constant. When the voltage $V_b$ of the voltage biasing source 21 is smaller than the voltage drop through the thyristor strings TH1, TH4, or TH2, TH3 the superconducting coil 19 current decreases.

As an example, for a 69 kV fault current limiter, each thyristor TH1 through TH4, of FIG. 1, may consist of 20 series connected thyristors which have a rating of 4.4 kV each. If the bias current of the voltage biasing source 21 is 2000 amperes, each thyristor TH1 through TH4 conducts 1000 amperes. At 1000 amperes, an individual thyristor in TH1, TH2, TH3, or TH4 may have a forward voltage drop of about 1.8 volts and a string of 20 thyristors may have a drop of 36 volts. Thus, the voltage biasing source 21 must have a forward voltage of 72 volts to overcome or equal the forward voltage drop through the thyristors TH1 through TH4. Thus, a biased voltage supply for this situation would be designed for a maximum voltage $V_b$ max of about 100 volts to maintain 2 kA bias current in operation. If during operation, the bias current must be reduced to obtain a current limiting action at a lower current level, the bias current may be reduced by reducing the bias voltage of the voltage biasing source 21 or by even making the bias voltage temporarily negative until the bias current has achieved its desired value.

Figure 3:
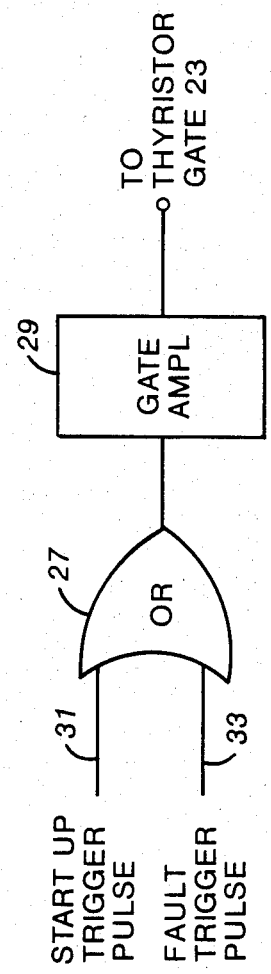
FIG. 3 is a diagram of a pulse circuit to trigger thyristors used in the circuit of FIG. 1.

FIG. 3, in conjunction with FIG. 1, shows the triggering mechanism for the thyristors TH1, TH2, TH3, and TH4. An ORgate 27 feeds a gate amplifier 29 which is matched to the gate triggering characteristics of the thyristor gates TH1, TH2, TH3, and TH4. There is an ORgate 27 and a gate amplifier 29 associated with each thyristor TH1, TH2, TH3, and TH4. Feeding the ORgate 27 are pulses for initial start-up on line 31. The start-up trigger pulses on line 31 initially put the thyristors TH1, TH2, TH3, and TH4 into conduction for normal operation. Also feeding the ORgate 27 on line 33 is the fault trigger pulse which is generated when a fault is sensed so that the thyristors TH1, TH2, TH3, and TH4 are triggered appropriately so as to reduce the current to zero within less than two cycles upon a complete fault sensing and for current limiting for a temporary period upon an overload condition, as will be explained hereinafter.

Figure 4:
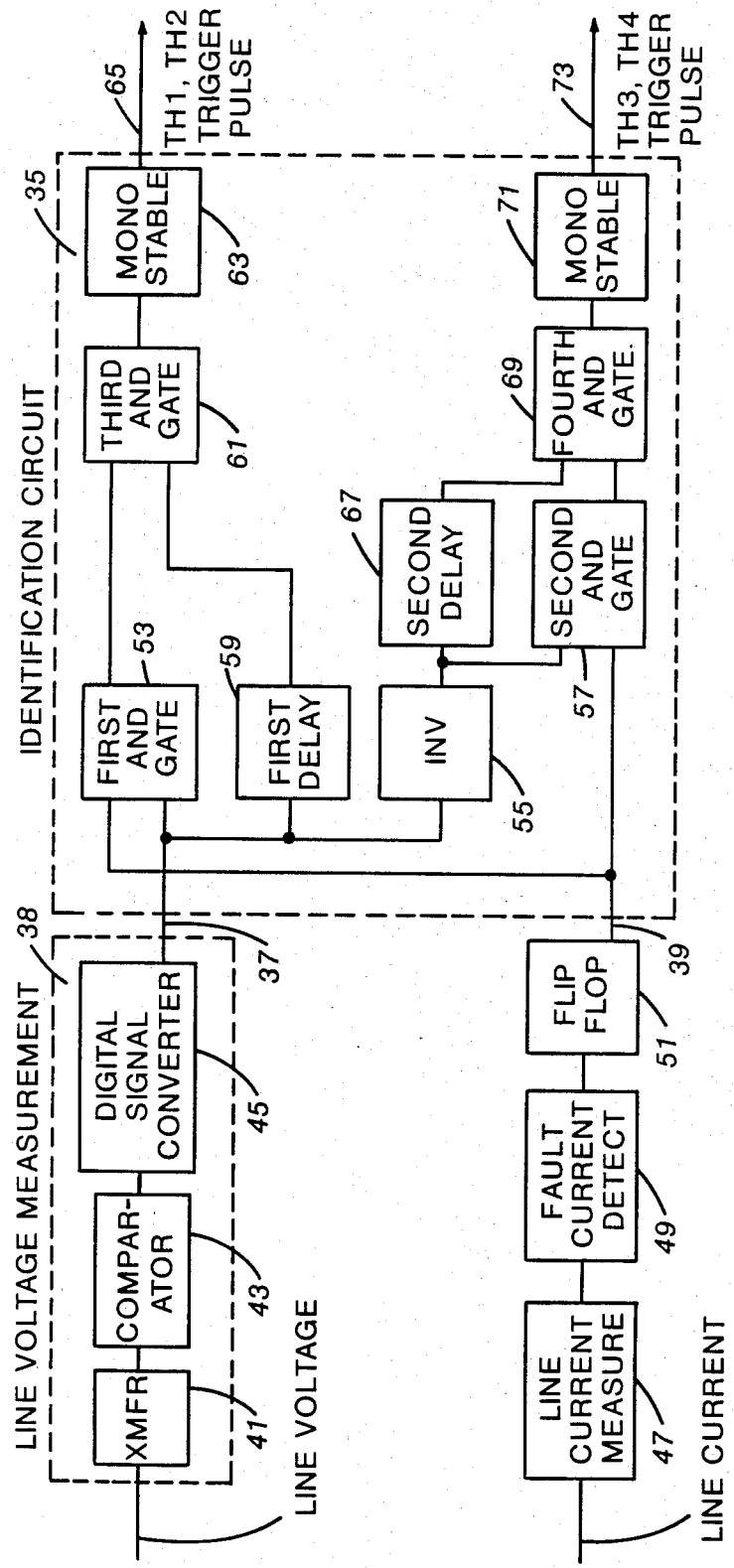
FIG. 4 is a diagram of a monitor and control system for controlling the solid-state circuit breaker of FIG. 1 under fault current and temporary current overload conditions.

With reference to FIG. 4, it is appreciated that once a fault condition is sensed in trigger pulses TH1, TH2, TH3, and TH4 are provided by an identification circuit 35. The identification circuit 35 has two inputs, the first being input 37 which is the output of the line voltage measurement circuit 38 and the second being on line 39 which is generated from measurements of line current. With inputs 37 and 39 the identification circuit 35 generates thyristor pulses TH1, TH2, TH3, and TH4 at such a time in the phase cycle so as to shut-down the current flow under fault conditions and to limit current flow under temporary overload conditions.

Figure 5:
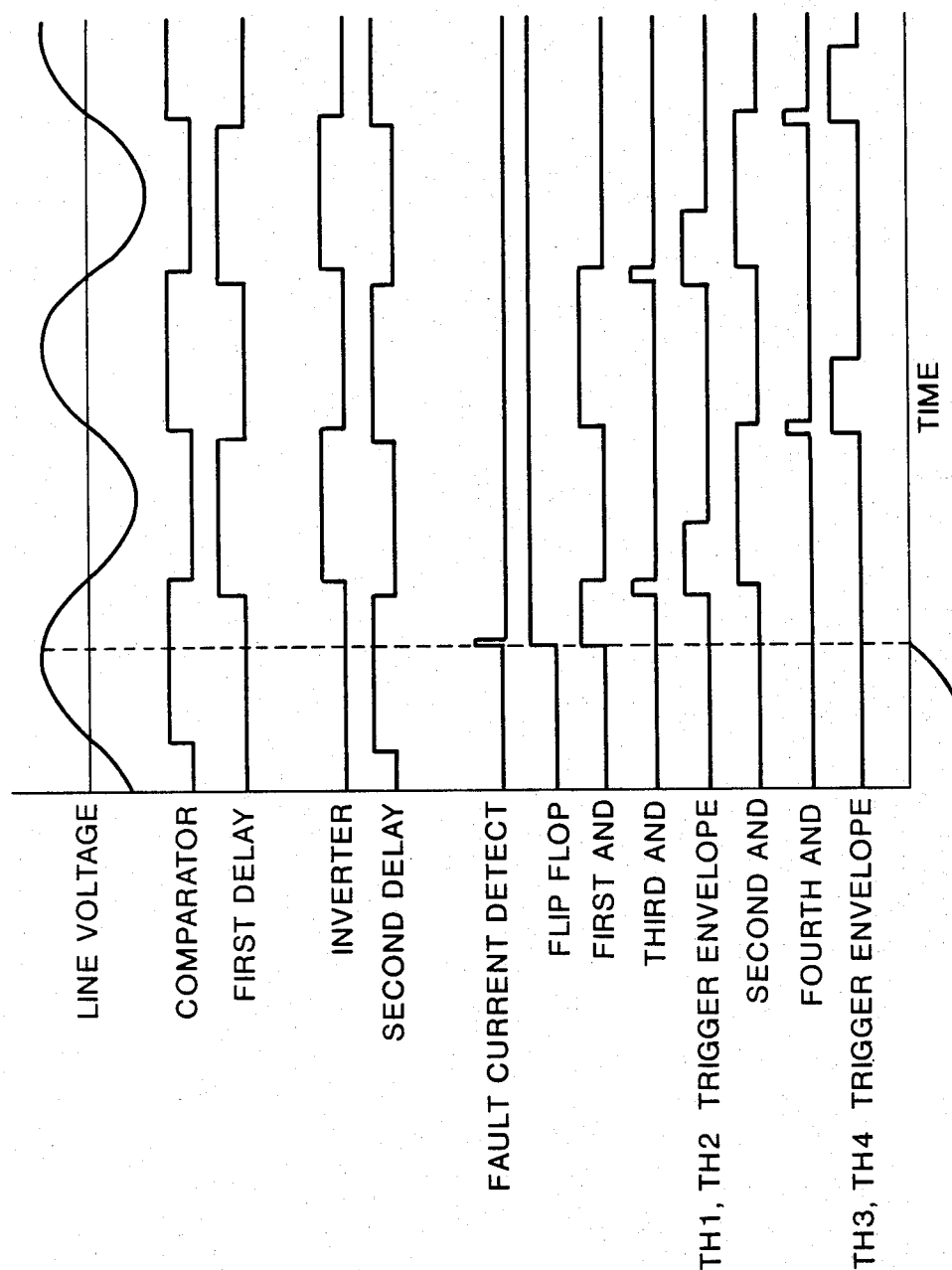
FIG. 5 is a timing and waveform diagram for the monitor and control system of FIG. 4.

The line voltage measurement circuit 38 includes a step-down transformer 41 which reduces the line voltage to a level acceptable for further processing. The lower level line voltage is then fed to comparator 43 which produce a positive output voltage so long as the line voltage is positive and a zero output voltage when the line voltage is negative. The comparator 43 then feeds a digital signal converter 45 which is a buffer circuit that provides a logical one when the comparator output 43 is positive and a logical zero when the comparator 43 output is zero. Thus, the waveform generated on line 37 is a logical one when the line voltage is positive and a logical zero when the line voltage is negative. The waveform and timing diagrams for the circuits shown in FIG. 4 are illustrated in FIG. 5.

Likewise, with continued reference to FIG. 4, the line current is measured by a line current measurement circuit 47 which feeds a fault current detection circuit 49. Once the fault current detection circuit 49 senses a fault current condition it produces a logical one to a flip flop 51 which stretches the output of fault current detector 49, see FIG. 5. The flip flop 51 functions to stretch the logical one period out for time sufficient under fault conditions to reduce the current to zero. Thus, the flip flop 51 may be reset upon a given period or condition or otherwise may be fashioned as a monostable multivibrator and thus be self resetting.

The output of the digital signal converter 45 on line 37 feeds a first ANDgate 53, and through an inverter 55, a second ANDgate 57. The output of the flip flop 51 feeds on line 39 the first ANDgate 53 and the second ANDgate 57. Thus, if the fault occurs during the positive half-cycle, the ANDgate 53 outputs a logic of one during each positive half-cycle and the ANDgate 57 during each negative half-cycle of the line voltage.

The digital signal converter 45 output on line 37 also feeds a first delay circuit 59 which delays every logical one generated by the digital signal converter 45 for a period, commonly 7.6 ms which corresponds to 165° delay of the 60 Hz line voltage. The outputs of the first ANDgate 53 and the first delay circuit 59 are fed to a third ANDgate 61 which generates a logical one during each positive half-cycle of the line voltage 165° delayed from the positive zero crossing. This logical one from the third ANDgate 61 is fed to a monostable multivibrator 63 having a period of approximately 4 ms to produce an output pulse of 4 ms on line 65 to trigger thyristors TH1 and TH2. As is common in the art, a picket fence or a multipulsed signal may also be generated by a monostable type circuit 63 for a period of 4 ms to trigger the thyristors TH1 and TH2. Compare for example, FIG. 5 with FIG. 6 and FIG. 7.

Likewise, the second delay circuit 67 feeds a fourth ANDgate 69 together with the output of the second ANDgate 57 to produce a pulse in each negative half-voltage cycle of the line voltage 165° delayed from each negative voltage crossing. The output of the fourth ANDgate 69 is fed to a monostable multivibrator 71 which produces on output line 73 a 4 ms pulse, or with additional circuiting not shown, a plurality of pulses lasting for 4 ms total to trigger the thyristors TH3 and TH4.

As will be described hereinafter, a delayed period of 7.6 ms for the first delayed circuit 59 and the second delayed circuit 67 produces trigger pulses on lines 65 and 73 at a delayed phase of 165° which ideally reduces current to zero in approximately two cycles and is the preferred delay period for a fault current condition.

However, under temporary overload conditions the first delay circuit 59 and the second delay circuit 67 may be decreased to produce a pulse, for example, at 90 electrical degrees. Under this condition the superconducting coil 19 current (see FIG. 1) stays constant and the line current to the load 13 also stays constant. This mode of operation is implemented for a temporary overload.

Figure 6:
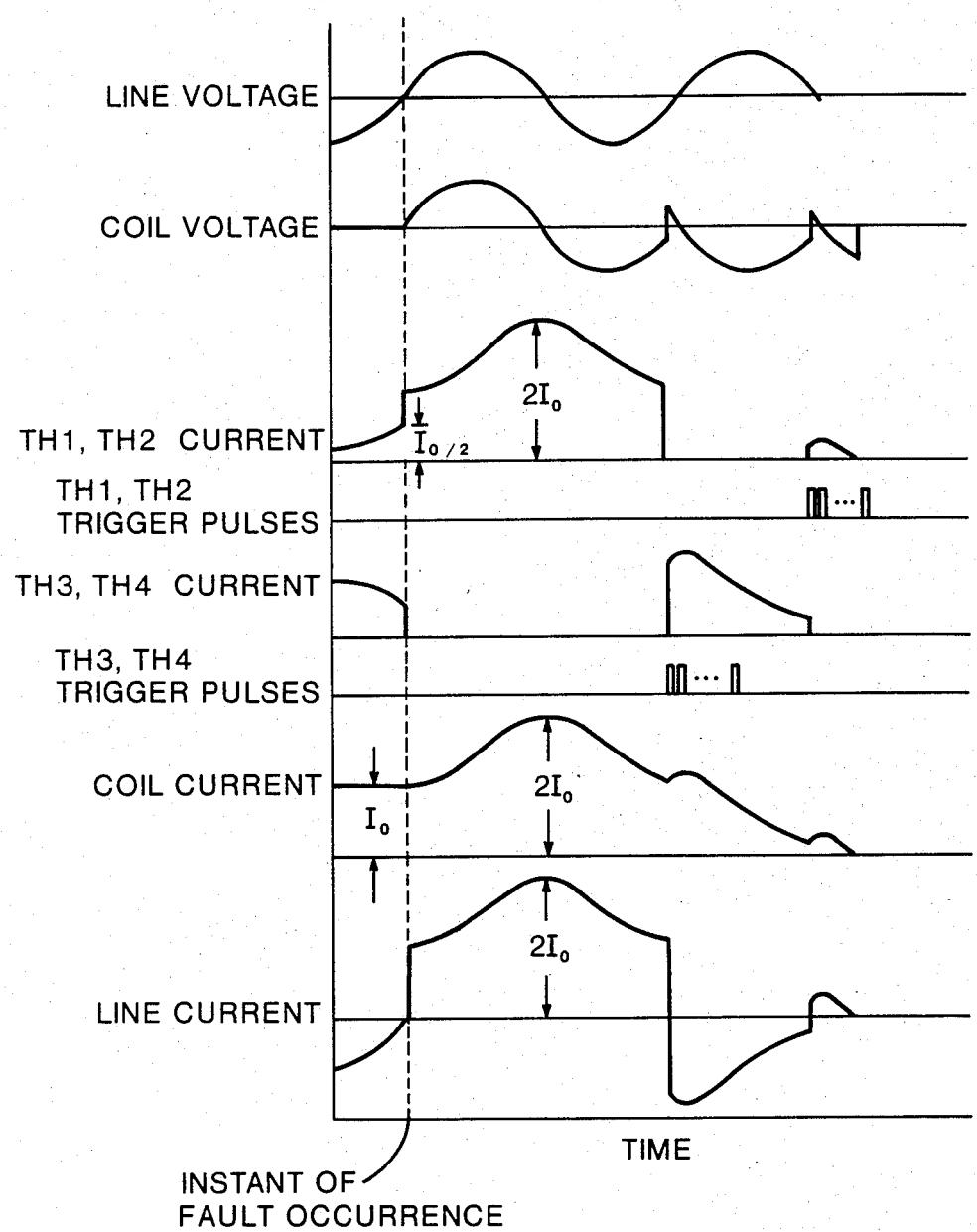
FIG. 6 is a timing and waveform diagram for the circuit of FIG. 1 under a fault current condition.

The functioning of the present invention under fault conditions can best be appreciated by observing FIG. 6 in conjunction with the circuit shown in FIG. 1. When a fault occurs the biasing current (designated $I_o$ in FIGS. 6 and 7) is no longer sufficient to keep bidirectional line current flowing through thyristors TH1 through TH4 and a voltage in phase with the line voltage develops across the superconducting coil 19. The identification circuit 35 functions to generate triggering pulses for TH1 through TH4 at 165° phase delay as described above and shown in FIG. 6. For most reliable triggering commonly a series of short pulses are used rather than a single pulse. Ideally a phase delay of 180° would be preferred but the practical characteristics of thyristors TH1 through TH4 require a shorter delay for reliable operation. The superconducting coil 19 current increases from its normal biasing current level of $I_o$ to twice that value before being reduced to zero in slightly less than two cycles. Likewise the line current increases to twice the value of $I_o$ before being reduced to zero in slightly over two cycles. With both the line current and the superconducting coil 19 current at zero the thyristors TH1 through TH4 are not further triggered and are left in a non-conducting state thereby preventing current flow to the load 13. Under this zero current flow condition the circuit breaker 17 may be opened if desired to provide an actual mechanical interruption of possible further flow.

Figure 7:
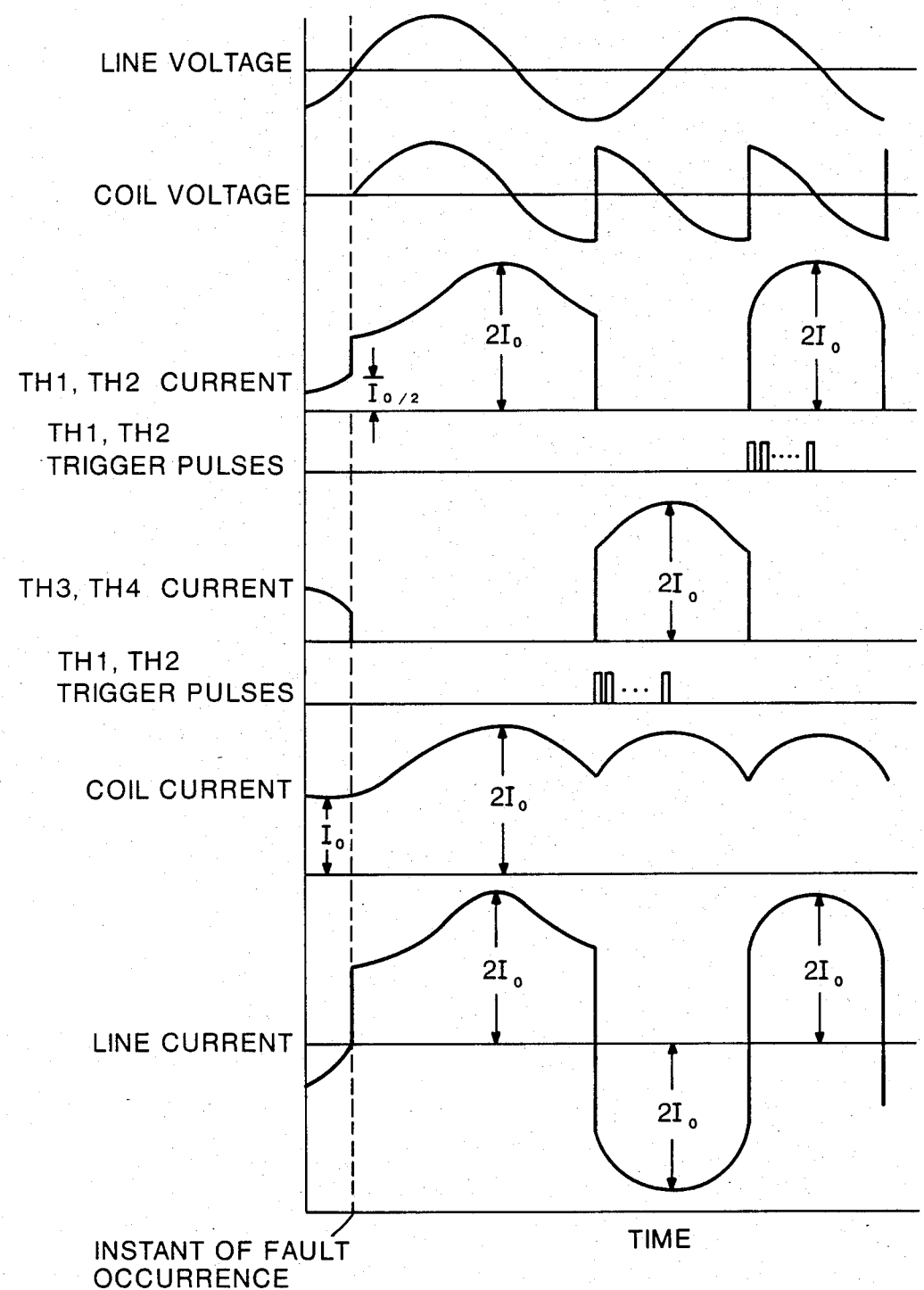
FIG. 7 is a timing and waveform diagram for the circuit of FIG. 1 under an overload current condition.

Under a temporary overload condition the line current can be maintained at a peak value of twice the normal biasing value of $I_o$, see FIG. 7. Here the thyristors are triggered at a delay of only 90° as compared to the delay of 165° under the above-described fault current shut-down mode of operation. Here the superconducting coil 19 current is maintained at a peak value of twice its normal biasing value of $I_o$ and the line current likewise is limited to twice the normal biasing current $I_o$. If the temporary overload condition ceases, normal operation is automatically resumed. If it persists beyond a few cycles the triggering phase angle can be increased from 90° to 165° and the fault current shut-down mode of operation will occur as above described.

The foregoing description of the preferred embodiment(s) of the invention have been presented for purposes of illustration and description. It is not intended to be exhaustive or to limit the invention to the precise form disclosed, and obviously many modifications and variations are possible in light of the above teaching. As an example, a separate identification circuit 35 could be utilized for fault and overload operational modes. Further, of course, triggering phase delays of other than precisely 90° or 165° may also be used. Finally the precise logic arrangement of the identification circuit 35 may assume various embodiments and still perform the same function as described, as is well known in the art. The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A solid-state circuit breaker and current control system for a load supplied current from an ac source having a source impedance, said solid-state circuit breaker and current control system comprising:
   a thyristor bridge interposing said ac source and said load, said thyristor bridge having four legs and four nodes with a first node thereof connected to said ac source and a second node connected to said load;
   a superconducting coil having an impedance larger with respect to said source impedance;
   a dc source connected in series with said superconducting coil between a third and a fourth node of said thyristor bridge, said dc source of such voltage and current levels as to forward bias each leg of said thyristor bridge sufficiently as to permit bidirectional current flow therethrough at a desired maximum current level generated by said ac source; and
   control means for limiting under fault conditions said ac current flow to said load to twice the desired maximum current level generated by said ac source, and
   for gating said thyristor bridge under fault current conditions to quickly reduce ac current therethrough to zero and thereafter to keep said thyristor bridge open thereby preventing further current flow therethrough.

2. The invention of claim 1 wherein said control means under fault conditions reduces said ac current flow to said load to zero in approximately two ac cycles.

3. The invention of claim 1 wherein said control means under fault conditions reduces said ac current flow to said load to zero in less than two ac cycles.

4. A solid-state circuit breaker and current control system for a load supplied current from an ac source having a source impedance, said solid-state circuit breaker and current control system comprising:
   a thyristor bridge interposing said ac source and said load, said thyristor bridge having four legs and four nodes with a first node thereof connected to said ac source and a second node connected to said load;
   a superconducting coil having an impedance large with respect to said source impedance;
   a dc source connected in series with said superconducting coil between a third and a fourth node of said thyristor bridge, said dc source of such voltage and current levels as to forward bias each leg of said thyristor bridge sufficiently as to permit bidirectional current flow therethrough at a desired maximum current level generated by said ac source; and
   control means for limiting under temporary current overload conditions current to said load to substantially twice the desired maximum current level generated by said ac source, and for gating said thyristor bridge under temporary current overload conditions to limit ac current flow therethrough to said load.

* * * * *